United States Patent [19]

Lecerf et al.

[11] 4,268,588
[45] May 19, 1981

[54] SOLID POSITIVE ACTIVE MATERIAL FOR HIGH SPECIFIC ENERGY ELECTRIC CELLS

[75] Inventors: André Lecerf, Pacé; Michel Broussely, Poitiers, both of France

[73] Assignee: Gipelec, Levallois Perrét, France

[21] Appl. No.: 96,005

[22] Filed: Nov. 20, 1979

[30] Foreign Application Priority Data

Nov. 22, 1978 [FR] France .................... 78 32924

[51] Int. Cl.³ ................................ H01M 6/14
[52] U.S. Cl. ....................... 429/194; 429/218; 429/220
[58] Field of Search ............. 423/593, 604, 617; 429/220, 219, 194, 218; 252/182.1, 518, 519

[56] References Cited

U.S. PATENT DOCUMENTS

| 4,085,259 | 4/1978 | Lauck | 429/194 |
| 4,091,191 | 5/1978 | Gaines | 429/194 |
| 4,163,829 | 8/1979 | Kronenberg | 429/194 |
| 4,172,927 | 10/1979 | Toyoguchi et al. | 429/194 |
| 4,184,016 | 1/1980 | Lecerf | 429/194 |

OTHER PUBLICATIONS

J.-C. Boivin et al., Minutes of the Scientific Academy (C. R. Acad. Sc.) Paris, vol. 276 (1973), Series C-1105.
R. Arpe et al., Z. anorz. allg. Chem. 426, 1-139, (1976).
German technical paper, "Isolierte quadratisch planare $CuO_4{}^{-6}$-Polyeder in $CuBi_2O_4$, ein neuer Bautyp zur Formel $Me_2{}^{3+}M^{2+}O_4$.

Primary Examiner—Anthony Skapars
Attorney, Agent, or Firm—Kenyon & Kenyon

[57] ABSTRACT

The invention relates to a solid positive active material for electric cells whose negative active material is an alkali metal. In accordance with the invention, said positive material is a compound formed by two oxides, namely, bismuth oxide $Bi_2O_3$ and cupric oxide $CuO$. Application to lithium cells.

6 Claims, 2 Drawing Figures

SOLID POSITIVE ACTIVE MATERIAL FOR HIGH SPECIFIC ENERGY ELECTRIC CELLS

The present invention relates to a solid positive active material for high specific energy electric cells with a non-aqueous electrolyte, the negative active material of said cells being an alkali metal such as lithium.

In French patent application no. 77 30 946 of Oct. 14, 1977, and published under no. 2 406 312, the present Assignee describes compounds which resemble minium ($Pb_3O_4$) in that they result from the combination of an oxide which is acid in character with an oxide which is basic in character, such as lead oxide. The compound which, up till now, has given the best results is lead bismuthate which is formed by combining lead oxide PbO which is basic in character with bismuth oxide $Bi_2O_3$ which is acid in character.

The Assignee has sought an active material which, while maintaining a discharge voltage of the same order of magnitude as that of the bismuthate, has higher specific capacities (both by weight and by volume).

The invention therefore provides a positive material for an electric cell, said material consisting of a compound formed by two oxides, a first one of which is basic in character and the second one of which is acid in character, said first oxide being cupric oxide CuO, and said second oxide being bismuth oxide $Bi_2O_3$.

More precisely, the active material is a compound whose formula is $Bi_2O_3m$, CuO, e.g. $Bi_2CuO_4$. This compound was first mentioned in an article by Boivin, Thomas and Tridot on page 1105 of the Minutes of the Scientific Academy (C.R.Acad.Sci) of Paris, vol. 276 (Mar. 26. 1973) series C, which is incorporated herein by reference.

The invention also provides an electric cell whose negative active material is lithium, whose electrolyte is a non-aqueous solution, and whose positive active material is the above active material $Bi_2CuO_4$.

Advantageously, the electrolyte of the cell is a solution of lithium salt in an ether or a mixture of ethers.

Preferred ethers are tetrahydrofuran, dimethoxyethane, dioxolane and mixtures of these substances. An ester such as propylene carbonate or ethylene carbonate may be added thereto.

The preferred lithium salt is lithium perchlorate.

The invention will be better understood from the following description of one example of an electric cell which uses the positive active material in accordance with the invention, illustrated by the accompanying drawings in which.

Figure 1:
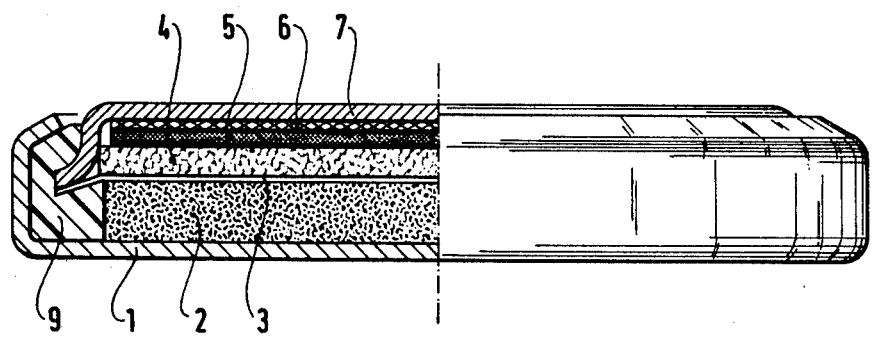
FIG. 1 illustrates an electric cell in accordance with the invention.

FIG. 1 illustrates a button-type electric cell whose active components are contained in a casing constituted firstly by a metal cup 1 which contains the positive active mass 2 and secondly by a metal cap 7 which contains the lithium negative active material 5 pressed onto a nickel mesh 6 welded to the cap 7. The cup 1 and the cap 7 are fitted together and electrically insulated from each other by an insulating seal 9. The negative active material 5 and the positive mass 2 are separated from each other by a barrier 3 which consists of a microporous polypropylene film and a layer 4 of glass fibres which contains the electrolyte.

The overall dimensions of the cell are: height: 2.5 mm; and diameter: 25 mm. The active area is about 3 $cm^2$.

The composition by weight of the positive active mass is as follows:

Copper bismuthate ($Bi_2CuO_4$): 77%
Polytetrafluoroethylene: 4%
Lead powder (inert electronic conductor): 19%

The quantity of active mass is 1.2 g. This corresponds to a theoretical capacity of 363 mAh.

The quantity of lithium corresponds to a theoretical capacity of 400 mAh.

The electrolyte is a 2 M solution of lithium perchlorate in dioxolane.

Cells thus constituted have been discharged through a resistance of 1000 ohms. This is a severe test condition.

Figure 2:
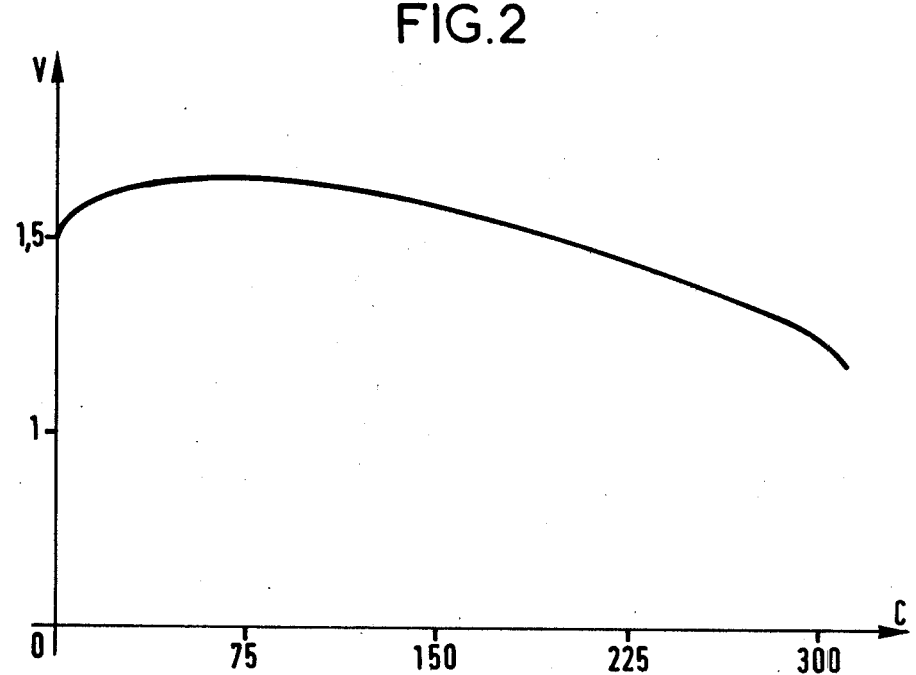
FIG. 2 shows a discharge curve of the cell illustrated in FIG. 1.

FIG. 2 shows the discharge curve of such a cell. The discharged capacity C (in mAh) is plotted along the X-axis and the voltage V at the terminals of the cell is plotted along the Y-axis.

As shown in FIG. 2, discharge, stopped at 1.2 volts, gives 313 milliampere-hours.

Therefore, such a cell has an efficiency of 86%.

Of course, the invention is not limited to the embodiment which is described hereinabove; in particular, the electric cell which uses the active material in accordance with the invention can have any other suitable configuration.

We claim:

1. An electric cell comprising a casing containing a positive active material, a negative active material, and an electrolyte, said positive active material consisting of a compound formed by two oxides, a first one of which is basic in character and the second one of which is acid in character, said first oxide being cupric oxide CuO, said second oxide being bismuth oxide $Bi_2O_3$, and said compound being $Bi_2CuO_4$.

2. An electric cell according to claim 1 wherein said negative active material is lithium, and wherein said electrolyte is a non-aqueous solution.

3. An electric cell according to claim 2, wherein the electrolyte is a solution of a lithium salt in a solvent which contains at least one ether.

4. An electric cell according to claim 3, wherein said ether is chosen from the group consisting of dioxolane, tetrahydrofuran, dimethoxyethane, and mixtures of these substances.

5. An electric cell according to claim 4, wherein said solvent also includes an ester chosen from the group consisting of propylene carbonate and ethylene carbonate.

6. An electric cell according to any of one of claims 3 to 5, wherein said lithium salt is lithium perchlorate.

* * * * *